Nov. 26, 1957 — L. B. CAYOT — 2,814,130
LAUNDRY DRIER
Filed April 20, 1953 — 7 Sheets-Sheet 1

INVENTOR.
LYNN B. CAYOT
BY Philip Subkow
ATTORNEY.

Nov. 26, 1957  L. B. CAYOT  2,814,130
LAUNDRY DRIER
Filed April 20, 1953  7 Sheets-Sheet 2

INVENTOR
LYNN B. CAYOT
BY
ATTORNEY.

Nov. 26, 1957  L. B. CAYOT  2,814,130
LAUNDRY DRIER

Filed April 20, 1953  7 Sheets-Sheet 3

INVENTOR.
LYNN B. CAYOT
By Philip Subkow
ATTORNEY.

Nov. 26, 1957     L. B. CAYOT     2,814,130

LAUNDRY DRIER

Filed April 20, 1953     7 Sheets-Sheet 4

Fig. 7.

INVENTOR.
LYNN B. CAYOT
ATTORNEY.

Nov. 26, 1957

L. B. CAYOT 2,814,130

LAUNDRY DRIER

Filed April 20, 1953

INVENTOR.
LYNN B. CAYOT
BY
ATTORNEY.

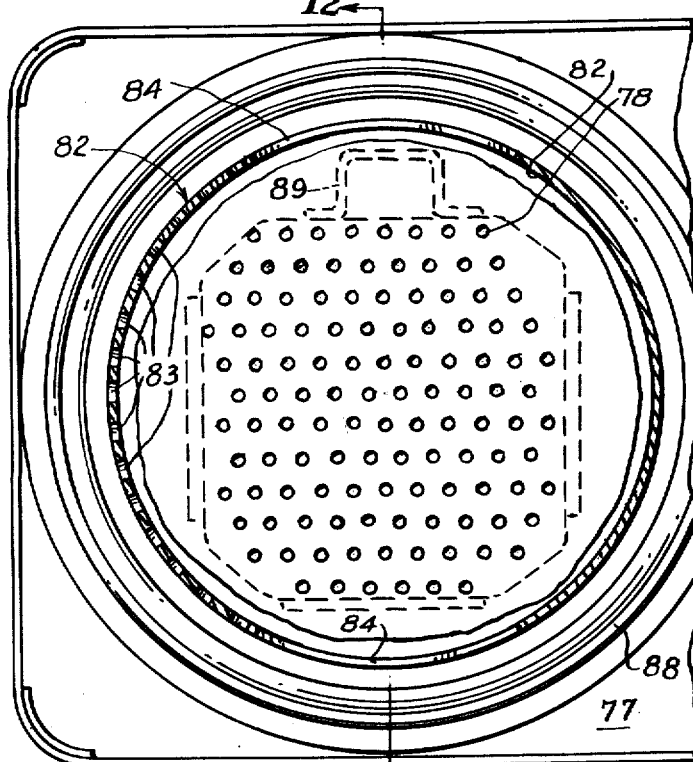
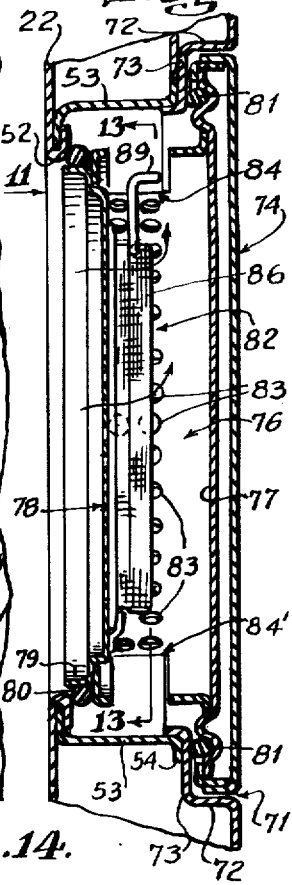
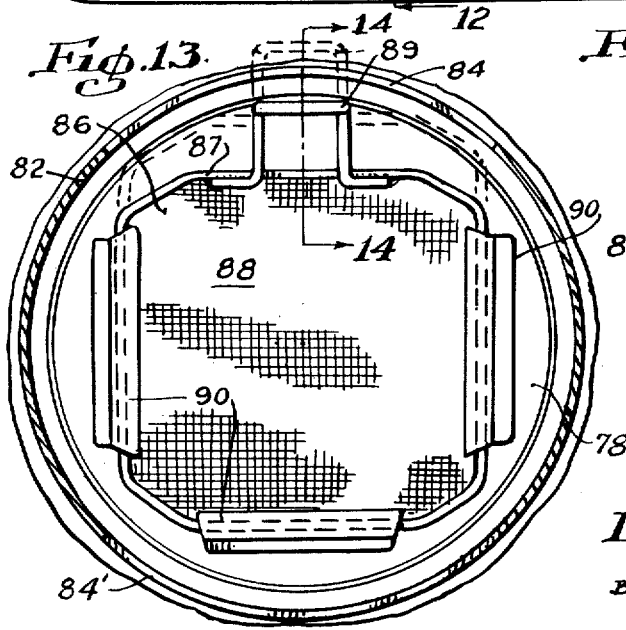
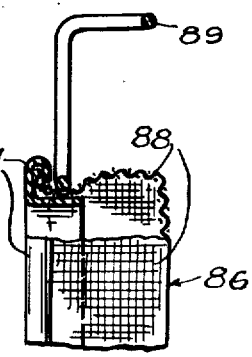

United States Patent Office 2,814,130
Patented Nov. 26, 1957

2,814,130

LAUNDRY DRIER

Lynn B. Cayot, Alhambra, Calif., assignor to Commonwealth Company, Alhambra, Calif., a copartnership Application April 20, 1953, Serial No. 349,904

14 Claims. (Cl. 34—82)

This invention relates to a drier and more particularly to driers in which the clothes are tubbed in a rotary drier and are dried by a current of heated air.

Laundry driers of the rotary drum type in which a current of air is directed through the rear of the drum and discharged from the front of the drum have been suggested by the prior art.

I have devised an improved design for such driers in which the air circulation, while directed generally axially of the drum from rear to front, is introduced into the drum at a point eccentric from the axis of rotation. By so doing I am able to avoid overheating of the bearings and shafts employed for rotation of the drum and also avoid by-passing of the clothes by the air.

In the construction of my device I employ an eccentrically located inlet and permit the discharge of the air from the drum through an outlet in the front of the drum. One useful feature incorporated in the design of my invention is the interposition of a lint screen in said discharge.

In a preferred embodiment of my invention I provide the front of the drum with a central opening to which I connect a discharge conduit, said discharge conduit leading the air from the rotary drum into a discharge funnel.

It is one of the objects of my invention to provide means for encasing the drum in an outer case having an opening in communication with the central opening, a door being provided to close said opening in the case, said door forming part of the conduit for the discharge of gas from the drum.

It is an additional object of my invention to place a lint screen in the door so that it is readily accessible.

It is a further object of my invention to employ a flue for the inlet of hot gas to the drum and for the outlet of the gas and structural members to increase the stability and strength of the structure on which the drum is rotatably mounted.

It is an additional object of my invention to provide the drum with a metallic cover on the rear of the drum and to introduce the hot air from the hot air inlet flue at a localized point in said rear cover positioned eccentrically from the axis of rotation of the drum.

These and other objects of my invention will be further described by reference to the drawings, in which:

Fig. 7 is a view, partly in section, taken on the line 7—7 of Fig. 5;

Fig. 11 is a view partly in section taken on the line 11—11 of Fig. 3;

Fig. 12 is a sectional elevation taken on the line 12—12 of Fig. 11;

Fig. 13 is a view partly in section taken on the line 13—13 of Fig. 12;

Fig. 14 is a view partly in section taken on the line 14—14 of Fig. 13.

Figure 3:
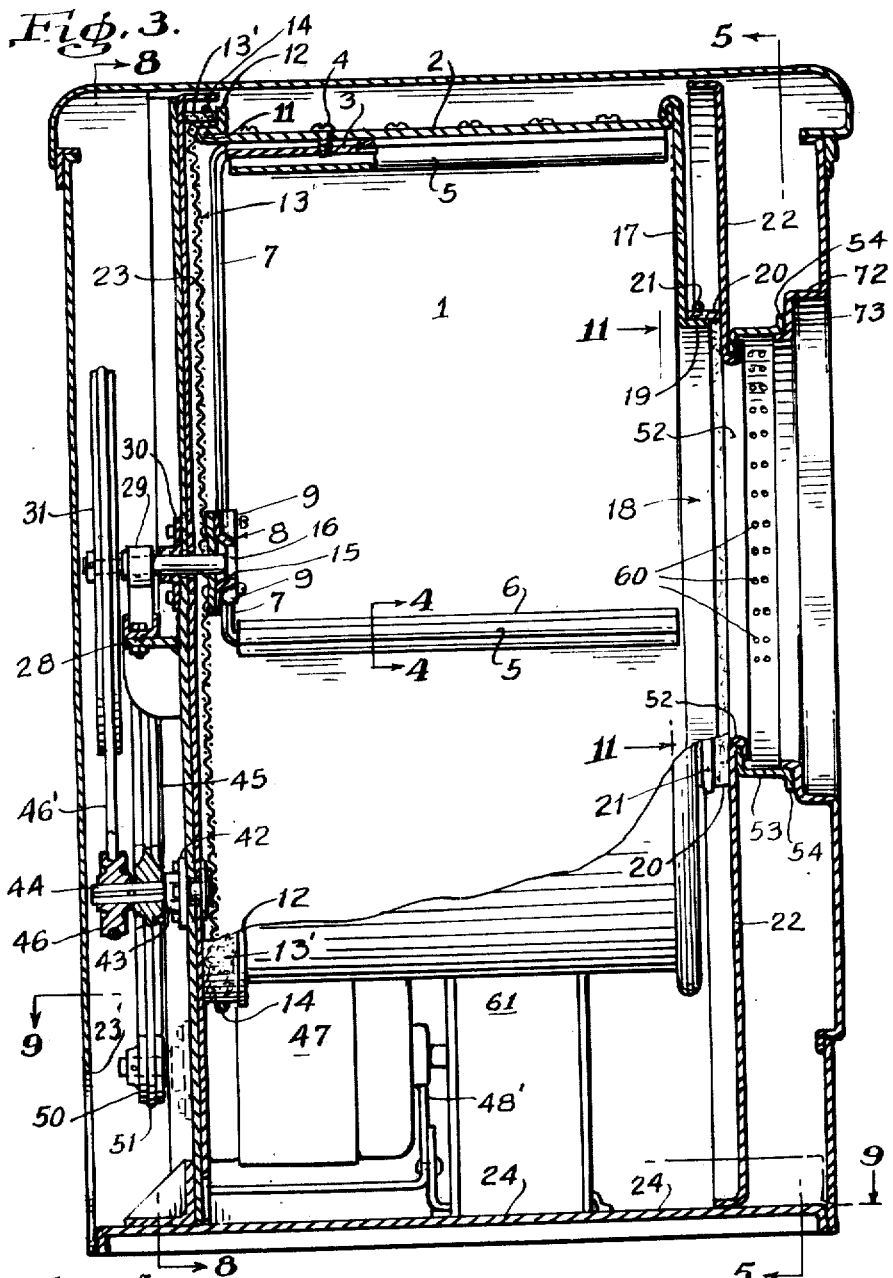
Fig. 3 is a view partly in section taken on the line 3—3 of Fig. 1.
Figure 4:
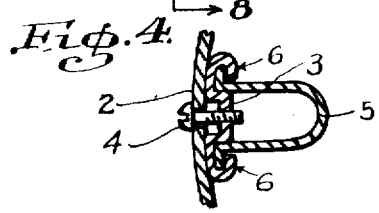
Fig. 4 is a sectional detail taken on the line 4—4 of Fig. 3.
Figures 5, 6:
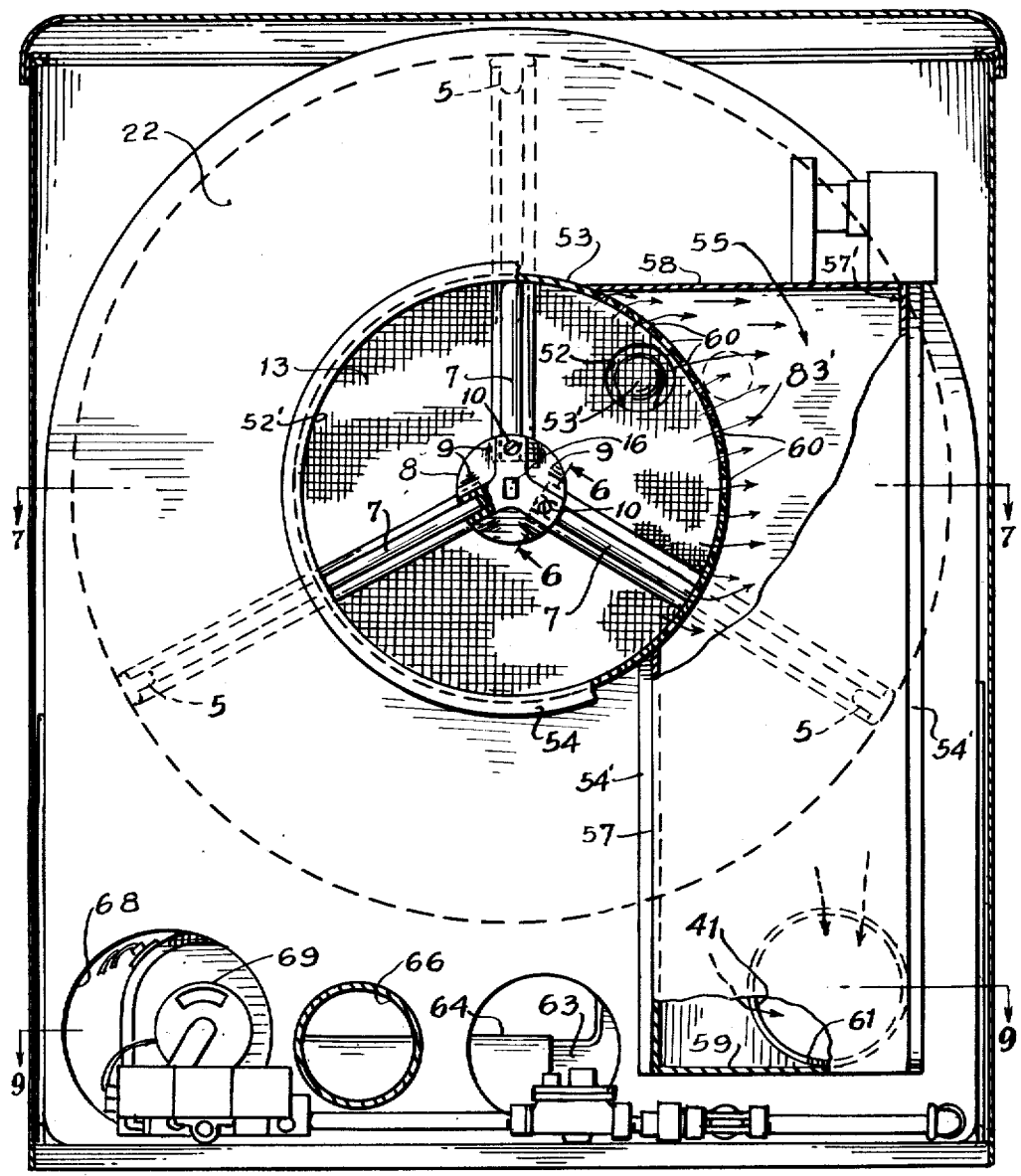
Fig. 5 is an elevation, partly in section, taken on the line 5—5 of Fig. 3.
Fig. 6 is a sectional detail taken on the line 6—6 of Fig. 5.

The drier includes a rotatably mounted drum 1 having a circumambient cylindrical imperforate wall 2 as shown in Figs. 3 and 7. Upon the inner surface of the cylindrical wall 2 are equally spaced bars 3 mounted on the wall 2 by screws 4 (see Figs. 3, 4, 7). Said bars carry U-shaped paddles 5 which are secured to the bars 3 by clinched-over return flanges 6 (see Figs. 4 and 6). These paddles extend but a short distance away from the cylindrical wall (see Figs. 3, 4, 7).

The spider disk 8 disposed centrally of the drum carries three equally spaced radially disked channels 9 into which the arms 7 are inserted and held in place by screws 10. The ends of the arms 7 are connected to the bars 3 and the paddles 5 and thus support the drum 1. The rear end of the wall 2 is turned back into a U-bend 11 which terminates into a circumferential ring flange 12 extending perpendicular to the outer face of the drum 1. The screen 13 extends over the rear end of the drum 1 and is turned over the bend 11. A felt gasket ring seal 13' is mounted on the flange 12 and is secured against the turned over portion of the screen by means of wire 14 which is wound around the gasket 13'.

A rectangular hole 15 is provided in disk 8. The shaft 16 is flattened to pass through the hole 15. Covering the front end of the drum is an annular covering ring 17 secured at its outer peripheral edge to the front end of the drum. The ring 17 has a central opening 18 formed by an outwardly turned circular flange 19 perpendicular to the outer face of the ring 17. Mounted on the flange 19 is a gasket ring 20 secured to the flange by a wire 21.

Figure 1:
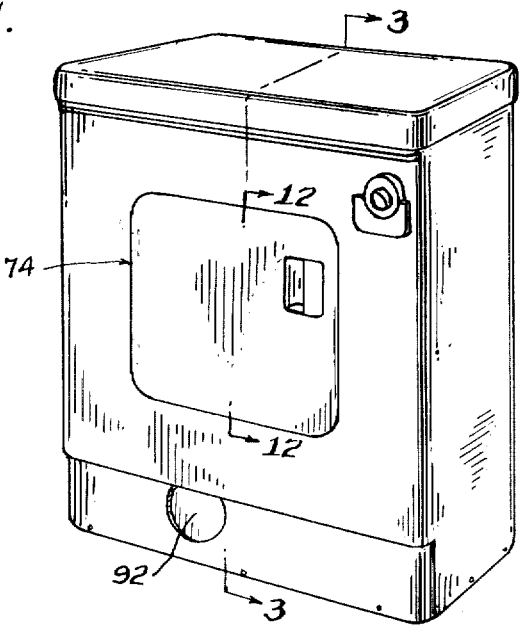
Fig. 1 is an isometric view of the outside casing of the drier.
Figure 2:
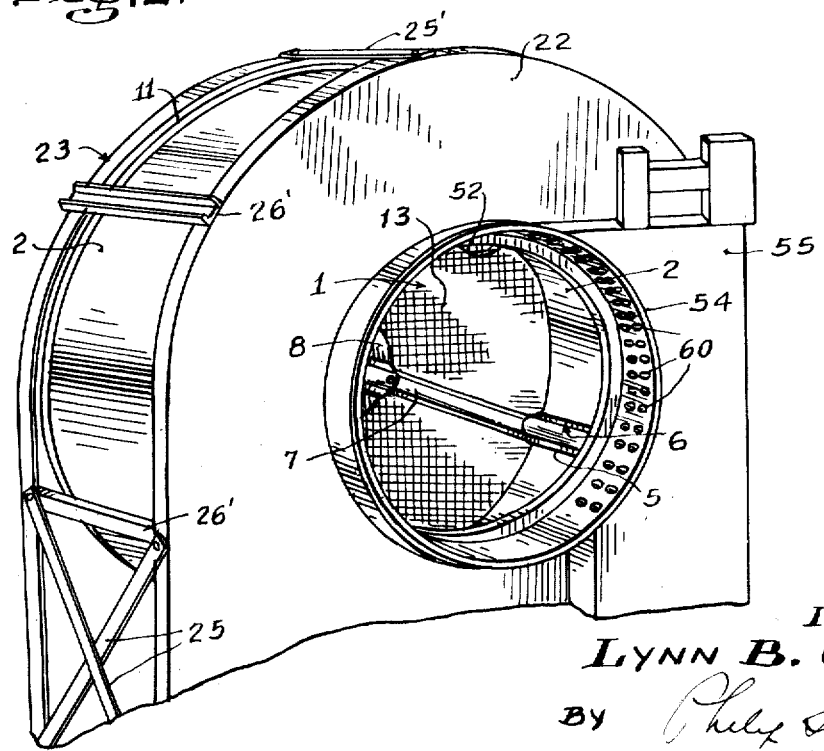
Fig. 2 is an isometric view of the frame and casing with the drier drum in place.

The drum is mounted for rotation between a front wall or bulkhead 22 and a rear wall or bulkhead 23. These bulkheads are vertically mounted on the base plate 24 and are held in spaced relation by the straps 25 (see Fig. 2) spaced on both sides and across the top of the bulkheads. Mounted on the exterior surface of the rear bulkhead 23 is a channel member 26 the face of which is secured to the rear face of the bulkhead 23. Mounted between the webs 27 of the channel 26 is a bracket 28 on which is mounted bearing 29. Bearing plate 30 is mounted on the exterior surface of the channel 26 in line with the bearing 29. The shaft 16 passes through the bearing plate and bearing and carries the pulley 31.

Figure 8:
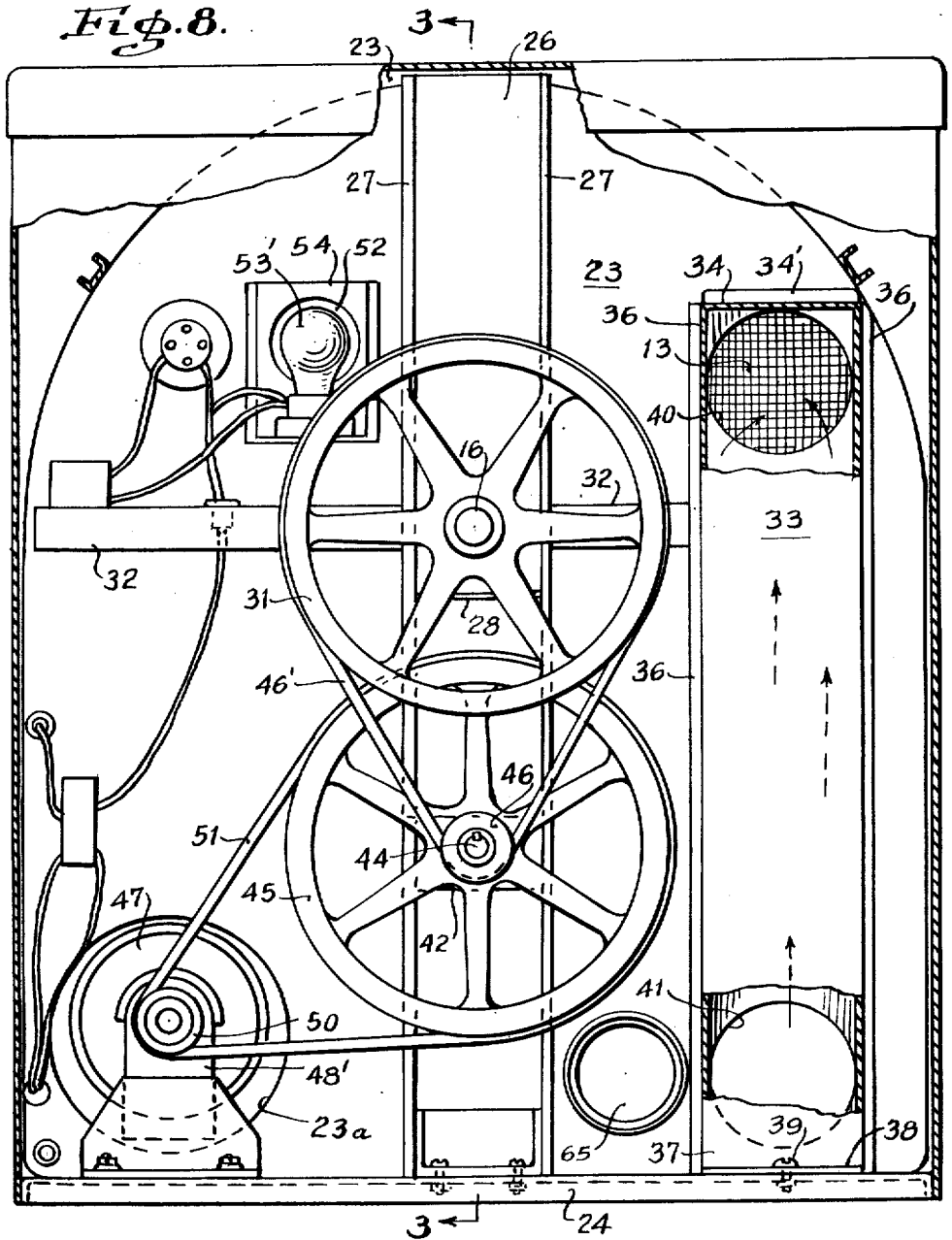
Fig. 8 is a rear view, partly in section, taken on the line 8—8 of Fig. 3.
Figure 9:
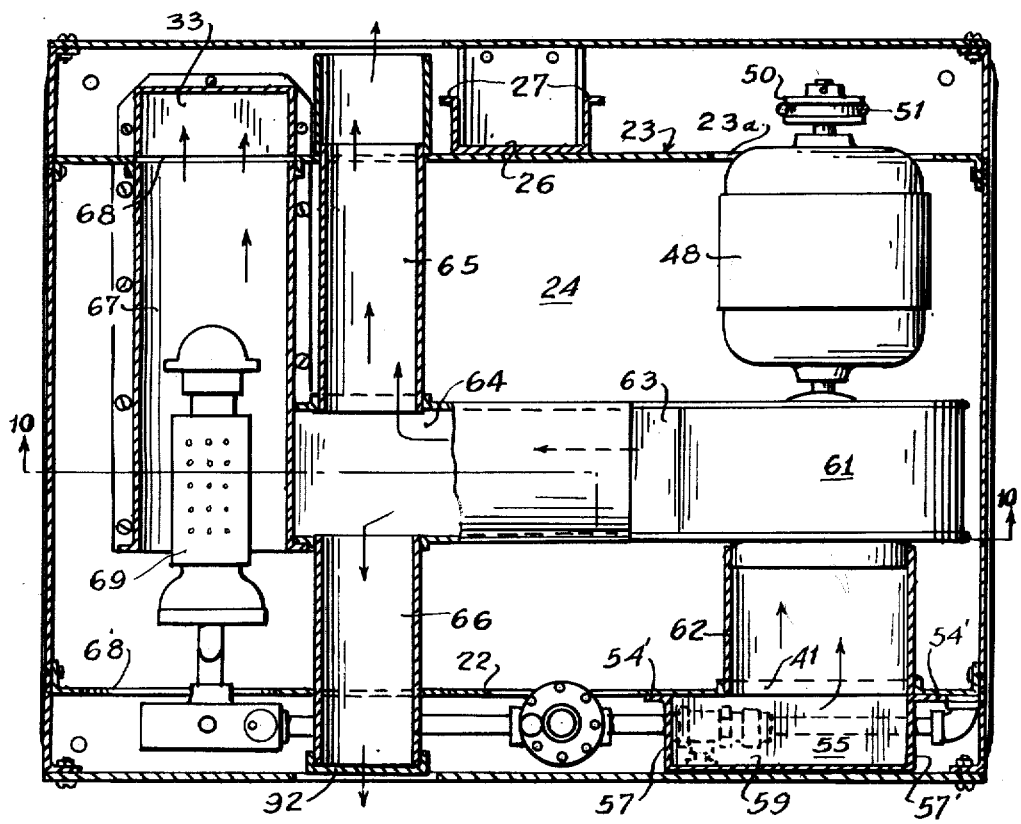
Fig. 9 is a plan view in section taken on the line 9—9 of Fig. 3.
Figure 10:
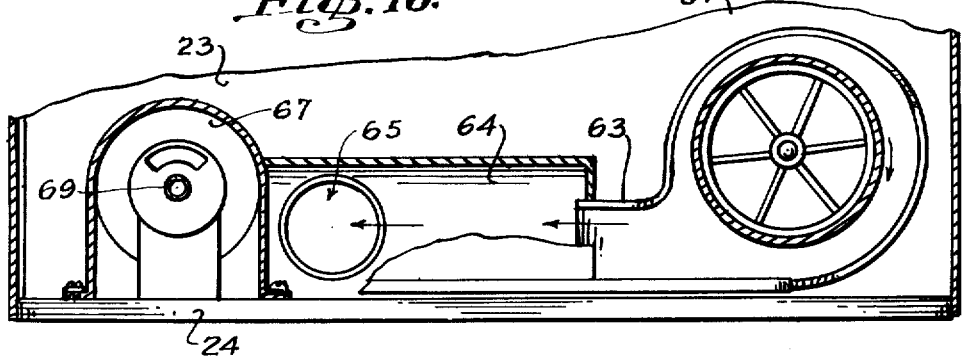
Fig. 10 is a view in section taken on the line 10—10 of Fig. 9.

The bulkhead is further reinforced by means of the horizontal channel member 32 and the flue box 33 (see Figs. 7, 8). The flue box is in the form of a channel closed at the top end by a plate 34 having an upturned edge flange 34'. The opposite ends of the webs 36 and the base 37 rest on the plate 24. The base 37 carries an inturned perpendicular end flange 38 which is placed on the base 24 and secured thereto by screw 39. The out-turned flanges 34' and 36 are secured to the exterior surface of the rear bulkhead 23 to make an airtight passageway. A port 40 cut in the bulkhead 23 near the top of the channel underneath the top 34 between the webs 36 makes a hot air passageway from the flue 33 through the screen 13 into the drum. It will be observed that the hole 40 is placed eccentrically of the axis of the drum adjacent but inside the wall 2. A port 41 is also provided in the bulkhead 23 above the base plate 24 and positioned between the webs 36.

Mounted on the webs 27 is a bracket 42 carrying a bearing 43 in which shaft 44 is journalled. The shaft carries a large pulley 45 and a small pulley 46. The belt 46' drives the pulley 31 from pulley 46. A motor 47 mounted on the base plate 24 and on the cradle 48' carries a pulley 50 connected by a belt 51 to the pulley 45.

At the upper end of the bulkhead 23 is provided a hole 52 at the front of which a light bulb 53' may be mounted on a bracket 54 positioned on the bulkhead 23. Channels 32, 27, and 33 form longitudinal and horizontal bracings to hold the bulkhead rigid to prevent buckling or other distortion due to expansion or contraction due to heating or cooling. This assures a perfect alignment of the shaft 16 and assures free and easy rotation of the drum and, additionally, the ring seal formed by the contact of the end of the gasket 13' against the inner surface of the bulkhead 23.

The front bulkhead 22 is provided with a circular opening 52 concentric with opening 18 but of smaller radius so that the end of the ring gasket seal 20 may abut the inner surface of the bulkhead 22 around the opening. The ring 53 is mounted on the front of the bulkhead 22 around the opening 52. The exterior end of the ring 53 is turned outwardly into a ring flange 54.

Mounted on the front face of the bulkhead 22 is a flue box 55 forming a channel having a base 59, webs 57 and 57', and closed at the top 58 and bottom 59. The flue is attached to the pan of the bulkhead by means of longitudinal flanges 54' turned out from the webs 57 and 57'. The webs 57 and 57' are spaced from the center of ring 53 less than the radius of the ring and the webs are cut away to permit the entry of the ring into the interior of the flue 55. The circular flange 54 overlies the exterior surface of the flue 55 and the top 58 and the web 57 abut the ring 53 to make an air tight joint at these points. It will be observed that about one-fourth of the circumference of the ring 53 then enters into the flue 55. The wall of the ring 53 is perforated at this quadrant by a plurality of holes 60 spaced in uniform pattern between the face of the bulkhead and the inner surface of the flue 55 and between the top 58 and the web 57. The ring 53 thus forms an air passageway connecting the drum and the flue 55. A port 61 is cut in the bulkhead 22 adjacent and above the bottom 59 and between the webs 57 and 57'.

It will be observed that the flue 55 is positioned on the face of the bulkhead on the side of the axis of the drum opposite the position of the flue 33. The flue 55 acts to reinforce and hold rigid against distortion or buckling due to expansion that portion of the bulkhead adjacent thereto. In like manner the bulkhead 23 is held against buckling at the opposite side of the drum by means of the bulkhead 22 aided by the longitudinal and vertical channels. The braces 25 hold the bulkheads in fixed relation to each other. In this manner a rigid structure is obtained in which the bulkheads are kept in alignment with each other and do not buckle or distort when heated.

Positioned on the base plate 24 is a blower 61' connected for rotation to the motor 47. The suction blower is connected to the pipe 62 in turn communicating with the port 41. The discharge pipe 63 from the blower enters the tunnel 64 to which are connected, with extending U right angles, two oppositely extending pipes 65 and 66 forming a T connection with the tunnel 64. The pipe 65 extends through a port in the bulkhead 23 adjacent the flue 33 and pipe 66 extends through the bulkhead 22 adjacent the burner to be described below.

A heating tunnel 67 mounted on base plate 24 abuts and seals off the end of the tunnel 64 and extends parallel to 65 and 66. One end of the tunnel adjacent the bulkhead 23 is open and is in communication with a hole 68 in the bulkhead. The other end of the tunnel 67 is spaced from the inner surface of the bulkhead 22. A burner 69 is positioned in the tunnel 67.

The case 70 has an opening 71 concentric with the ring 53 (see Fig. 12) but of greater diameter and is framed by an inturned right angled ring flange having a horizontal ring flange portion 72 and a vertical ring flange portion 73. The flange 73 abuts and joins the ring flange 54. The flanges 53, 72, and 73 form a joint for the door 74. The door is hinged on the case 70 by hinges 75 and carries a cylindrical compartment 76, on the interior wall 77 of the door, one end of the compartment being formed by the wall 77 and the other end being closed by the perforated wall 78. The wall 78 carries a horizontal ring flange 79 on which is mounted a ring gasket 80 which, when the door is closed, abuts and seals the edge of the opening 52 in the bulkhead 22. The outer edge of the wall 77 carries a ring gasket 81 which, when the door is closed, abuts and seals the door at the flange 73.

The cylindrical wall 82 of the compartment 76 is perforated with holes 83 through a quadrant of its circumference so that they register with the holes 60 when the door is closed. The wall 82 is cut away at the top 84 and bottom 84' of the wall so as to permit passage of a filter 86 into the compartment 76. The filter is formed of a frame 87 across which the filter medium, such as cheesecloth or wire mesh, 88 may be stretched. The filter has a handle 89 which extends through the opening 84 to permit its withdrawal. The filter is retained on the inner surface of the wall 78 by means of three brackets 90 into which the frame may be placed.

Controls for operating the burner and for controlling the operation of the motor, blower and drum for proper drying are conventional and used generally in domestic driers, and since they form no part of this invention, although usefully employed therewith, will not be further described. Those skilled in the art will understand how to employ them in the drier described herein.

In operating the drier, the door 74 is opened and the clothes are introduced into the drum. The lint filter 86 is placed in the compartment 76 and the door is closed. The motor rotates the drum and simultaneously rotates the blower.

It will be observed that the pulley 50, which is the power pulley for rotating the drum, is mounted on the same motor shaft as the blower and that the blower is mounted on the base plate. This reduces to a considerable degree the vibrations imposed on the unit since the vibrational load of the blower is not transmitted to the shaft 16 or to the bulkheads, but is isolated in the rigid base member.

The blower takes suction through 62. This places the drum under a slight vacuum, due to the seal obtained by the gaskets 13' and 20, which seals the drum from the case during rotation of the drum. Hot air is thus drawn from the drum; it passes through the perforations in the wall 78 of the door, through the screen 86, and makes a right angle turn to pass through the perforations 83 and 60 into the flue 55. The air thus passes through the blower and tunnel 64. If it is desired to discharge the air into the room in the rear, the cap 92 is retained on the end of the pipe 66. However, if the discharge is desired from the front of the case, as where the back of the drier is against a wall, the cap 92 may be placed over the end of the tube 65 after it is removed from the front of the case.

Since, as stated above, the drum is under a suction and is sealed against the bulkheads, air is drawn underneath the back of the case at 23' which ends above the base plate 24, then passes through the opening 23a and into the tunnel 67, up the flue 33, and through the port 40. The air enters the drum at a point eccentrically located. The high temperature air passes through the screen made of open wire mesh hardware cloth and passes generally axially of the drum. The rotation of the drum carrying the paddles tumbles the clothes in the drier across the flow of air. The seal formed by the gasket 13' against the rear bulkhead prevents leakage of hot air from the flue 33 around the drum and directs the entire air flow through the screen in front of port 40.

It will also be noted that the wire mesh cloth passes in front of the opening 40 and the spot of the hardware cloth which is thus heated by the hot air is rotated through 360°. During this rotation it cools off. Due to the good heat conduction of the metallic cloth, the average temperature of the wire mesh cloth is thus kept substantially below the entrance temperature of the hot air at the port 40.

It will also be observed that the drum is spaced from the top and sides of the case and sealed against the bulkhead by the gaskets 20 and 13'. Thus an air layer is created between the drum and case, insulating the drum from the case. Heat loss from the bottom of the drum is minimized by the location of the heating tunnel on the base plate which acts as a radiant source.

While I have described a particular embodiment of my invention for the purpose of illustration, it should be understood that various modifications and adaptations thereof may be made within the spirit of the invention as set forth in the appended claims.

I claim:

1. A drier comprising a front bulkhead, a rear bulkhead, a drum between said bulkheads, a shaft for said drum, a bearing for said shaft mounted adjacent said rear bulkhead, a screen on the end of said drum adjacent said rear bulkhead, a ring seal mounted on said drum around said screen, one edge of said ring seal being in sealing contact with said rear bulkhead, an elongated inlet flue rigidly connected to and facing said rear bulkhead, an air passageway in said rear bulkhead, said passageway being spaced eccentrically from the axis of rotation of said drum on said shaft and connecting said flue and the interior of said drum through said screen, said passageway being within said ring seal, an annular front closure for said drum adjacent the front bulkhead, an opening in said front bulkhead in registry with the opening in said annular closure, a circular flange mounted on said front bulkhead in registry with said opening in said front bulkhead, a ring seal connected to said annular closure and surrounding said opening in said closure, said seal abutting said front bulkhead on the side of said bulkhead toward said drum and positioned concentrically with said opening in said bulkhead, a ring flange on the front bulkhead extending from the opposite side of said front bulkhead, a channel member positioned on said opposite side of said front bulkhead, the sides of said channel attached to said bulkhead and the back of said channel being spaced away from said opposite side of said bulkhead by said sides, a top and bottom closure for said channel, a portion of the said annular ring flange forming a portion of one side of said channel, an air passageway in said portion of said annular ring flange, an air discharge passageway from said channel, a case enclosing said bulkheads and said drum, an opening in said case in registry with said ring flange, and a door mounted in said case closing said opening in said case and said ring flange.

2. A drier comprising a front bulkhead, a rear bulkhead, a drum between said bulkheads, a shaft for said drum, a bearing for said shaft mounted adjacent said rear bulkhead, a screen on the end of said drum adjacent said rear bulkhead, a ring seal mounted on said drum around said screen, one edge of said ring seal being in sealing contact with said rear bulkhead, an elongated inlet flue rigidly connected to and facing said rear bulkhead, an air passageway in said rear bulkhead, said passageway being spaced eccentrically from the axis of rotation of said drum on said shaft and connecting said flue and the interior of said drum through said screen, said passageway being within said ring seal, an annular front closure for said drum adjacent the front bulkhead, an opening in said front bulkhead in registry with the opening in said annular closure, a circular flange mounted on said front bulkhead in registry with said opening in said front bulkhead, a ring seal connected to said annular closure and surrounding said opening in said closure, said seal abutting said front bulkhead on the side of said bulkhead toward said drum and positioned concentrically with said opening in said bulkhead, a ring flange on the front bulkhead extending from the opposite side of said front bulkhead, a channel member positioned on said opposite side of said front bulkhead, the sides of said channel attached to said bulkhead and the back of said channel being spaced away from said opposite side of said bulkhead by said sides, a top and bottom closure for said channel, a portion of the said annular ring flange forming a portion of one side of said channel, an air passageway in said portion of said annular ring flange, an air discharge passageway from said channel, a case enclosing said bulkheads and said drum, an opening in said case in registry with said ring flange, a door mounted in said case closing said opening in said case and said ring flange, and a seal between the case and said ring flange.

3. A drier comprising a front bulkhead, a rear bulkhead, a drum between said bulkheads, a shaft for said drum, a bearing for said shaft mounted adjacent said rear bulkhead, a screen on the end of said drum adjacent said rear bulkhead, a ring seal mounted on said drum around said screen, one edge of said ring seal being in sealing contact with said rear bulkhead, an elongated inlet flue rigidly connected to and facing said rear bulkhead, an air passageway in said rear bulkhead, said passageway being spaced eccentrically from the axis of rotation of said drum on said shaft and connecting said flue and the interior of said drum through said screen, said passageway being within said ring seal, an annular front closure for said drum adjacent the front bulkhead, an opening in said front bulkhead in registry with the opening in said annular closure, a circular flange mounted on said front bulkhead in registry with said opening in said front bulkhead, a ring seal connected to said annular closure and surrounding said opening in said closure, said seal abutting said front bulkhead on the side of said bulkhead toward said drum and positioned concentrically with said opening in said bulkhead, a ring flange on the front bulkhead extending from the opposite side of said front bulkhead, a channel member positioned on said opposite side of said front bulkhead, the sides of said channel attached to said bulkhead and the back of said channel being spaced away from said opposite side of said bulkhead by said sides, a top and bottom closure for said channel, a portion of the said ring flange forming a portion of one side of said channel, an air passageway in said portion of said annular ring flange, an air discharge passageway from said channel, a case enclosing said bulkheads and said drum, an opening in said case in registry with said ring flange, a door mounted in said case closing said opening in said case and said ring flange, said door comprising an outer imperforate panel, an inner perforate panel, a circumambient wall between said panels, and an air passageway in said wall adjacent the the air passageway ring flange.

4. A drier comprising a front bulkhead, a rear bulkhead, a drum between said bulkheads, a shaft for said drum, a bearing for said shaft mounted adjacent said rear bulkhead, a screen on the end of said drum adjacent said rear bulkhead, a ring seal mounted on said drum around said screen, one edge of said ring seal being in sealing contact with said rear bulkhead, an elongated inlet flue rigidly connected to and facing said rear bulkhead, an air passageway in said rear bulkhead, said passageway being spaced eccentrically from the axis of rotation of said drum on said shaft and connecting said flue and the interior of said drum through said screen, said passageway being within said ring seal, an annular front closure for said drum adjacent the front bulkhead, an opening in said front bulkhead in registry with the opening in said annular closure, a circular flange mounted on said front bulkhead in registry with said opening in said front bulkhead, a ring seal connected to said annular closure and surrounding said opening in said closure, said seal abutting said front bulkhead on the side of said bulkhead toward said drum and positioned concentrically with said opening in said bulkhead, a ring flange on the front bulkhead extending from the opposite side of said front bulkhead, a channel member positioned on said opposite side of said front bulkhead, the sides of said channel attached to said bulkhead and the back of said channel being spaced away from said opposite side of said bulkhead by said sides, a top and bottom closure for said channel, a portion of the said ring flange forming a portion of one side of said channel, an air passageway in said portion of said ring flange, an air discharge passageway from said channel, a case enclosing said bulkheads and said drum, an opening in said case in registry with said ring flange, a door mounted in said case closing said opening in said case and said ring flange, and a removable screen positioned in said door between said panels.

5. A drier comprising a front bulkhead, a rear bulkhead, a drum between said bulkheads, a shaft for said drum, a bearing for said shaft mounted adjacent said rear bulkhead, a screen on the end of said drum adjacent said rear bulkhead, a ring seal mounted on said drum around said screen, one edge of said ring seal being in sealing contact with said rear bulkhead, an elongated inlet flue rigidly connected to and facing said rear bulkhead, an air passageway in said rear bulkhead, said passageway being spaced eccentrically from the axis of rotation of said drum on said shaft and connecting said flue and the interior of said drum through said screen, said passageway being within said ring seal, an annular front closure for said drum adjacent the front bulkhead, an opening in said front bulkhead in registry with the opening in said annular closure, a circular flange mounted on said front bulkhead in registry with said opening in said front bulkhead, a ring seal connected to said annular closure and surrounding said opening in said closure, said seal abutting said front bulkhead on the side of said bulkhead toward said drum and positioned concentrically with said opening in said bulkhead, a ring flange on the front bulkhead extending from the opposite side of said front bulkhead, a channel member positioned on said opposite side of said front bulkhead, the sides of said channel attached to said bulkhead and the back of said channel being spaced away from said opposite side of said bulkhead by said sides, a top and bottom closure for said channel, a portion of the said ring flange forming a portion of one side of said channel, air passageways in said portion of said ring flange, an air discharge passageway from said channel, a case enclosing said bulkheads and said drum, an opening in said case in registry with said ring flange, a door mounted in said case closing said opening in said case and said ring flange, said door comprising an outer imperforate panel, an inner perforate panel, a circumambient wall between said panels, air passageways in said wall adjacent the air passageways in said ring flange, and a removable lint screen positioned in said compartment in said door between said panels.

6. A drier comprising a case, a drum rotatably mounted in said case, said drum having a rear wall and an imperforate peripheral wall, an air inlet into said drum through said rear wall, an annular closure for the front of said drum, an air conduit, one end of said conduit being in communication with the opening in said annular closure, a ring seal between said drum and said end of said conduit to make an air tight rotary joint between the drum and said conduit, an opening in said case in registry with the opening in said annular closure, a door mounted in said case, said door comprising an outer imperforate panel, an inner perforate panel, a circumambient wall between said panels, said wall and the said perforate panel extending into said conduit when said door is closed, a seal between said door and said conduit to close off the end of said conduit adjacent said imperforate panel, air discharge passageways in a wall of said conduit and in said circumambient wall, and an air discharge conduit in communication with said last named air passageways.

7. In the drier of claim 6, said circumambient wall having a slot therein, and a removable lint screen positioned between said panels through said slot.

8. A drier comprising a front bulkhead, a rear bulkhead, a drum between said bulkheads, a shaft for said drum, a bearing for said shaft mounted adjacent said rear bulkhead, a screen on the end of said drum adjacent said rear bulkhead, a ring seal mounted on said drum around said screen, one edge of said ring seal being in sealing contact with said rear bulkhead, an elongated inlet flue rigidly connected to and facing said rear bulkhead to one side of said shaft, an air passageway in said rear bulkhead, said passageway being spaced eccentrically from the axis of rotation of said drum on said shaft and connecting said flue and the interior of said drum through said screen, said passageway being within said ring seal, an annular front closure for said drum adjacent the front bulkhead, an opening in said front bulkhead in registry with the opening in said annular closure, a ring seal connected to said annular closure and surrounding said opening in said closure, said seal abutting said front bulkhead on the side of said bulkhead toward said drum and positioned concentrically with said opening in said bulkhead, an elongated flue positioned on the opposite side of said front bulkhead and to the side of said shaft opposite to the first mentioned flue, an air discharge passageway from said drum to said flue on said front bulkhead, an air discharge passageway from said last named flue, a case enclosing said bulkheads and said drum and an opening in said case communicating with said drum and a door in said opening.

9. A drier comprising a front bulkhead, a rear bulkhead, a drum between said bulkheads, a shaft for said drum, a bearing for said shaft, a screen on the end of said drum adjacent said rear bulkhead, a ring seal mounted on said drum around said screen, said ring seal being in sealing contact with said rear bulkhead and an elongated inlet flue rigidly connected to and facing said rear bulkhead, an air passageway in said rear bulkhead, said passageway being spaced eccentrically from the axis of said rotation of said drum on said shaft and connecting said flue and the interior of said drum through said screen, an opening in said front bulkhead in registry with said drum, a ring seal connected to said drum and in sealing contact with said front bulkhead around said opening in said front bulkhead, an elongated outlet flue rigidly connected to said front bulkhead, an air passageway from said drum through said bulkhead into said last named elongated flue and a heated air inlet into the first mentioned flue.

10. A drier comprising a case, a drum rotatably mounted in said case, said drum having a perforated end wall and an imperforate peripheral wall, the opposite end of said drum having an axial opening therein, means providing a conduit for hot air, said conduit having an outlet adjacent a restricted area of said perforated end wall adjacent the periphery of said drum, an opening in said case in registry with the opening in said opposite end of said drum, a door in said opening in said case, said door comprising an outer imperforate panel, a compartment in said door forming an air passageway in said door, an air inlet from said drum to said air passageway, an air discharge flue in said case, and an air passage connecting said passageway in said door and said air discharge flue.

11. A drier comprising a case, a drum rotatably mounted in case case, said drum having a perforated end wall, the opposite end of said drum having an axial opening therein, means providing a conduit for hot air, said conduit having an outlet adjacent a restricted area of said perforated end wall adjacent the periphery of said drum, an air discharge conduit in communication with said opening in said opposite end of said drum, a rotary seal between said drum and said air discharge conduit, a removable imperforate closure for said conduit spaced from said drum, an air discharge passageway from said conduit between said closure and said seal, and an air discharge flue connected to said last named air discharge conduit.

12. A drier comprising a drum having a rear wall with an opening therein and an imperforate peripheral wall, said drum being rotatably mounted on a shaft axially disposed of said drum at said rear wall, a support for said shaft, means forming a hot air passageway adjacent said rear wall of said drum, said hot air passageway having a hot air discharge at one end thereof, said discharge being positioned adjacent to and in communication with said opening in the rear wall of said drum, said discharge being spaced eccentrically from the axis of said drum, a front bulkhead adjacent the front end of said drum, an opening in said front bulkhead in registry with said drum, a ring seal connected to said drum and in sealing contact with said front bulkhead around said opening in said front bulkhead, an elongated outlet flue rigidly connected to and extending along said front bulkhead, means defining an air passageway extending from said drum axially thereof and into said last named elongated flue, a case enclosing said drum, and an air discharge conduit connected to said last named elongated flue, said conduit discharging to the atmosphere exteriorly of said case.

13. A drier comprising a drum having a rear wall with an opening therein and an imperforate peripheral wall, said drum being rotatably mounted on a shaft axially disposed of said drum at said rear wall, a support for said shaft, a rear bulkhead adjacent the rear end of said drum, a ring seal mounted on said rear end of said drum, said ring seal being in sealing contact with said rear bulkhead, an elongated inlet flue rigidly connected to and facing said rear bulkhead, an air passageway in said rear bulkhead, said passageway being spaced eccentrically from the axis of rotation of said drum and connecting said flue and the interior of said drum through said opening therein, said drum having an air outlet axially thereof, a case enclosing said drum, an opening in said case in communication with said drum, a door in said opening, and means defining an air discharge passageway through said door in communication with the air outlet from said drum.

14. A drier comprising a drum, said drum having a rear wall having an opening therein and an imperforate peripheral wall, a shaft for said drum axially positioned at said rear wall, a shaft support, means for rotating said shaft and said drum, a pair of spaced supporting walls, said drum being mounted on said shaft between said supporting walls, a ring seal between the rear end of said drum and one of said supporting walls and about said shaft, a hot air conduit connected to said last named wall and positioned between said ring seal and said shaft, said conduit communicating at one end with the atmosphere, a single passageway in said one supporting wall forming a hot air inlet communicating with the other end of said conduit and with the interior of said drum through the opening in said rear wall, said inlet being spaced eccentrically from the axis of rotation of said drum, an axial outlet from said drum at the other end thereof, an opening in said other supporting wall in registry with said outlet, a ring seal about said outlet and opening, and positioned between said drum and said other supporting wall, an air discharge conduit, one end thereof communicating with said outlet, the other end of said discharge conduit communicating with the atmosphere and being sealed from said drum, a case enclosing said supporting walls and drum, an opening in said case in communication with said drum and a door closure for said opening.

References Cited in the file of this patent
UNITED STATES PATENTS

| | | |
|---|---|---|
| 2,074,508 | Hetzer | Mar. 23, 1937 |
| 2,486,058 | Patterson et al. | Oct. 25, 1949 |
| 2,495,535 | Morrison | Jan. 24, 1950 |
| 2,521,712 | Geldhof | Sept. 12, 1950 |
| 2,540,725 | Geldhof | Feb. 6, 1951 |
| 2,608,769 | O'Neil | Sept. 2, 1952 |
| 2,619,734 | Geldhof et al. | Dec. 2, 1952 |
| 2,619,736 | Geldhof | Dec. 2, 1952 |
| 2,654,160 | Peterson | Oct. 6, 1953 |
| 2,722,057 | Pugh | Nov. 1, 1955 |

OTHER REFERENCES

Speed Queen Dryer Parts Manual, Models DE6–DE7, Speed Queen Corporation; Ripon, Wisconsin. Undated but marked "Prices effective Jan. 1, 1953." 10 pages.

"The New Automatic Speed Queen," form 467, 4 page leaflet published by Speed Queen Corporation, Ripon, Wisconsin.

U. S. DEPARTMENT OF COMMERCE
PATENT OFFICE

CERTIFICATE OF CORRECTION

Patent No. 2,814,130 November 26, 1957

Lynn B. Cayot

It is hereby certified that error appears in the printed specification of the above numbered patent requiring correction and that the said Letters Patent should read as corrected below.

Column 6, line 62, strike out "the"; same line 62, after "passageway" insert --in said--; column 9, line 4, for "case case" read --said case--.

Signed and sealed this 25th day of February 1958.

(SEAL)
Attest:

KARL H. AXLINE
Attesting Officer

ROBERT C. WATSON
Commissioner of Patents